April 3, 1951  W. L. VERVEST ET AL  2,547,184
SHAFT CONTROL DEVICE
Filed Feb. 17, 1949
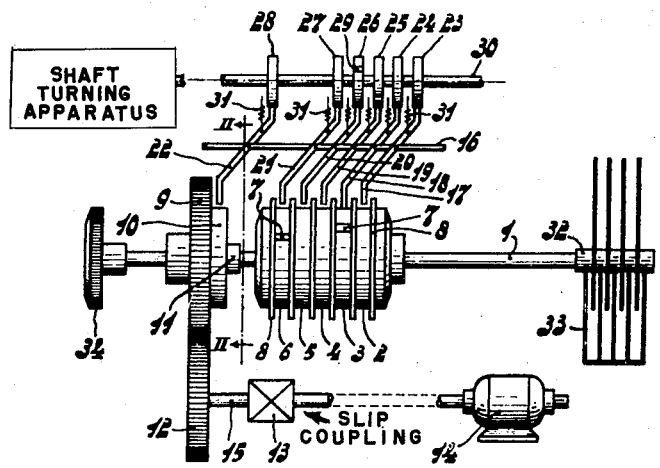
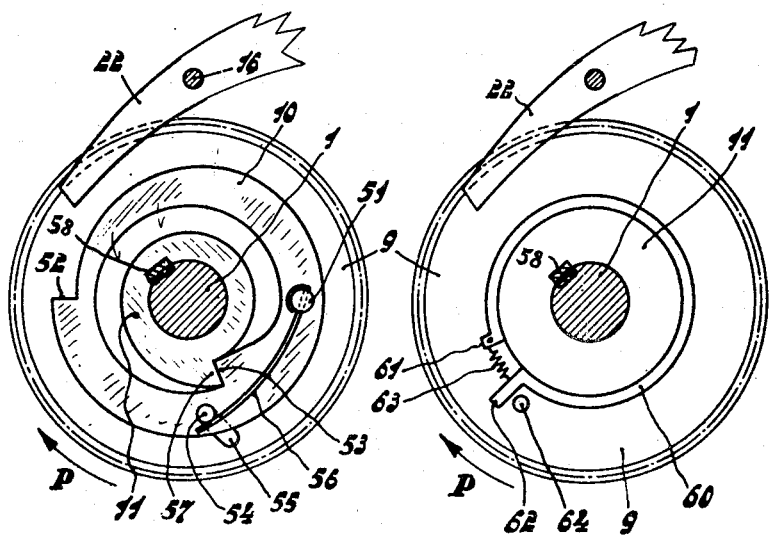
INVENTORS
WILHELMUS LAMBERTUS VERVEST
GODFRIED HENDRIK WAARLE
BY Fred M. Vogel
AGENT Patented Apr. 3, 1951

2,547,184

UNITED STATES PATENT OFFICE 2,547,184

SHAFT CONTROL DEVICE

Wilhelmus Lambertus Vervest and Godfried Hendrik Waarlé, Eindhoven, Netherlands, assignors to Hartford National Bank and Trust Company, Hartford, Conn., as trustee Application February 17, 1949, Serial No. 76,922
In the Netherlands March 19, 1948

6 Claims. (Cl. 74—10.2)

The present invention relates generally to apparatus for bringing a control member, for example a tuning condenser of a radio transmitting or receiving apparatus, into any one of a number of definite positions. More particularly the invention relates to such apparatus wherein use may be made of a combination of arresting devices for a shaft, each of which permit this shaft to be arrested in a predetermined position. Hereinafter, such a combination will be termed a "shaft-control device."

Specifically, the invention relates to a shaft-control device comprising arresting discs provided on a driven shaft and a system of movable pawls, any one of which may be actuated at will by way of a movable selecting member.

It is often desirable that, besides automatic adjustment of a control member by means of a shaft-control device which is actuated by a driving device, for example an electric motor, it should be possible to adjust the control member by hand in positions other than those determined by the arresting devices of the shaft-control device. In order that manual adjustment of the shaft comprising a shaft-control device may be effected satisfactorily it is necessary that the movement is not hampered by one or more of the arresting devices and the shaft comprising the control device does not cause the driving device to rotate at the same time which, in view of the transmission means usually provided between the two last-mentioned devices, would require considerable effort.

Shaft-control devices are known in which a friction coupling is provided between the driving device and the shaft comprising a shaft-control device. This has the advantage that several shaft-control devices, with each of which a control member is coupled, may be driven by the same driving device. As a rule, the shafts comprising control devices will not be arrested simultaneously, but owing to the friction couplings the locking of a shaft comprising a control device will not hamper the driving of the other shafts. Conversely, if all arresting devices for the shafts comprising control devices have been put out of action, manual operation of each shaft comprising a control device is possible at will, without causing the shafts of the other shaft-control devices and the driving device to follow.

However, the said devices exhibit the drawback that accurate and easy manual adjustment of a shaft comprising a control device is not possible, since the friction naturally present in the friction coupling and depending upon the state of operation, must be surmounted.

The present invention has for its object to provide a construction of a shaft-control device, which permits this disadvantage to be avoided and at the same time other advantages to be obtained.

According to the invention the shaft comprising a control device is driven by way of a member which is connected to the shaft through a disengageable coupling comprising a movable coupling element with which one of the movable pawls is adapted to co-operate in a manner such that the coupling element is actuated by the pawl with respect to the members to be coupled, as a result of which the connection between the said member and the shaft is broken and the shaft is freely rotatable. Since the selecting member is adapted to actuate only one of the pawls at a time, the pawls adapted to co-operate with the arresting discs will be out of action as soon as the selecting member is set in a manner such that the pawl co-operating with the coupling is brought into its operative position. Consequently, after disengagement of the coupling by the pawl the shaft comprising a control device is entirely released and may readily be rotated by hand in both directions of rotation and brought into any desired position. Disengagement of the shaft comprising a control device by way of a pawl controlled by the selecting member has the advantage that, in operating more than one shaft-control device by the same driving device likewise actuating the joint selecting members, all shafts comprising control devices are adapted to be disengaged simultaneously and brought into the state suitable for manual tuning.

In order that the invention may be clearly understood and readily carried into effect it will now be explained more fully with reference to the accompanying drawing, given by way of example, in which;

Fig. 1 represents diagrammatically a shaft-control device according to the invention.

Fig. 2 shows one construction of a coupling with the shaft of the control device as used in the shaft-control device shown in Fig. 1.

Fig. 3 shows a different construction of a disengageable coupling for use in this shaft-control device.

In Fig. 1 the reference numeral 1 designates a rotatable shaft carrying arresting discs 2 to 6 each of which is furnished with a marginal recess 7. The arresting discs are maintained stationary with respect to the shaft 1 by friction discs 8 fixed at both sides of each arresting disc on the shaft 1. The gear wheel 9 is arranged coaxially with shaft 1, and is connected to the movable coupling element 10 which co-operates with the bush 11 rigidly secured to the shaft 1 as by key element 58. The coupling element 10 and the bush 11 constitute a disengageable coupling as shown in Fig. 2 and explained hereinafter. The gear wheel 9 meshes with another gear wheel 12 which may be driven, through the coupling 13, by the motor 14. Upon overloading of the driven shaft 15 the coupling 13 releases and is, for example, a slipping clutch or a coupling which is re-engaged automatically after the overload of shaft 15 ceases. A coupling of this type has, for example, been described in French Patent specification 903,072.

The shaft 16 extends adjacent the shaft 1 and parallel thereto. This shaft 16 carries the pivoted pawls 17 to 22. One end of each pawl 17 to 21 is adapted to co-operate with one of the arresting discs 2 to 6. The pawl 22 has no companion arresting disc but is adapted to co-operate with the movable coupling element 10.

The other ends of the pawls 17 to 21 and also that of pawl 22 co-operate with the pawl selector discs 23 to 28. These discs are each furnished with a marginal recess 29. They are secured to the shaft 30 of the pawl selector in a manner such that the recesses are displaced relatively through an equal angle. The ends of the pawls are maintained on the pawl selector discs by springs 31. If a recess 29 is underneath one end of a pawl, the pawl in question engages this recess by the action of the associated spring 31 and the other end of the pawl co-operates with an arresting disc or, if pawl 22 is concerned, with the coupling element 10. Owing to the relative position of the pawl selector discs never more than one pawl is operative, whereas the others are lifted. In Fig. 1 the shaft 30 has been rotated in a manner such that the end of pawl 18 has engaged the recess of the pawl selector disc 24, so that the associated spring 31 maintains the other end of pawl 18 on the arresting disc 3. Upon rotation of shaft 1 by throwing in the motor 14, the recess 7 provided in the arresting disc 3 eventually arrives below the end in question of pawl 18, with the result that the latter becomes operative and arrests the shaft 1. Consequently the rotor 22 of the rotary-electrode condenser 33, which is coupled with shaft 1, occupies a position which is determined by the position occupied by the recess 7 of the arresting disc 3 with respect to shaft 1. Owing to the locking of shaft 1 the coupling 13 is released, so that the motor is allowed to slow down or may serve for further driving other similar devices coupled therewith.

For manual tuning, the pawl selector shaft 30 is rotated in such manner that the recess in the pawl selector disc 28 arrives below the end of pawl 22. Subsequently, the spring 31 associated with pawl 22 depresses the other end of this pawl, so that it stands in the way of the coupling element 10. On driving the gear wheel 9 this coupling element is arrested by pawl 22 so as to interrupt the connection between the coupling element and the bush 11, whereupon further movement of the gear wheel 9 is stopped and consequently the coupling 13 is released. The shaft 1 now stands entirely free from the gear wheel 9 and, since all pawls adapted to co-operate with an arresting disc have been lifted, the shaft 1 and consequently the condenser 33 can be given any desired position by means of the manually operated knob 34.

Upon rotation of the pawl selector shaft 30 the pawl 22 is lifted with the result that the coupling element is caused to resume its initial position by the action of a spring. On driving the gear wheel 9 the shaft 1 is caused to follow and may be arrested by any one of pawls 17 to 21.

The construction of the disengageable coupling between the gear wheel 9 and shaft 1 and the co-operation thereof with the pawl 22 are illustrated in Fig. 2 which is a section on the line II—II in Fig. 1.

The gear wheel 9 carries an eccentrically located pin 51 about which the flat, annular coupling element 10 is rotatable in a plane at right angles to shaft 1. About diametrically opposite the centre of rotation, the outer periphery of the ring 10 exhibits a lug-shaped projecting part 52. In addition the ring exhibits an internal projecting part 53 closer to pin 51. Furthermore, the coupling element 10 carries a pin 54 which engages through an aperture 55 provided in the gear wheel 9. The cam 53 on the inner side of the ring is maintained on the periphery of bush 11 rigidly secured to the shaft 1, by the action of spring 56 which is connected to pin 51 and engages pin 54. The bush 11 is provided with a cam 57 so that on driving the gear wheel 9 in the direction P the shaft 1 is carried along.

The pawl 22 may be actuated by way of the pawl selector shaft 30 with pawl selector disc 28 (Fig. 1) with the result that the end of the pawl extending in the plane of ring 10, arrives in the path of cam 52. Due to this, the ring 10 is rotated about pin 51 against the action of spring 56 until the pin 54 engages the edge of the aperture 55 provided in the gear wheel 9. In this event, further rotation of the gear wheel 9 is prevented so that the coupling 13 (Fig. 1) releases. Owing to rotation of the coupling element 10 about pin 51 the two lugs 53 and 57 stand free so that the shaft 1 is completely free. Upon lifting of the pawl 22 the coupling element 10 is urged back by the action of spring 56 thus re-establishing the connection with shaft 1.

Fig. 3 shows a different construction of the coupling between the gear wheel 9 and the shaft 1. The movable coupling element is constituted by a flexible clamping band 60 which surrounds the bush 11 substantially entirely and is in frictional engagement therewith. The end 61 of this band is connected to the gear wheel 9, the other end being furnished with a projecting part 62. A draw spring 63 is provided between the two ends. A pin 64 is provided on the gear wheel 9 close to the projecting part 62. If the gear wheel 9 is driven in the direction P, the bush 11 and consequently the shaft 1, to which it is keyed by key element 58, are carried along due to friction between the band 60 and the bush. Upon actuation of pawl 22, the projecting part 62 will run up against the end of the pawl. Spring 63 is stretched until the projecting part 62 engages the pin 64, so that any further rotation of the gear wheel 9 is prevented. The opening of the annular clamping band 60 results in the band releasing the bush 11.

In this event, also, putting the pawl 22 out of action results in that the connection is re-established, since the spring 63 tightens the band 60 about bush 11.

What we claim is:

1. A shaft control device comprising a driven shaft, a plurality of arresting discs mounted on said driven shaft, a plurality of movable pawls arranged beside said driven shaft, means for selectively actuating any one of said movable pawls, driving means for said driven shaft, said driving means comprising a member which is connected to said shaft through a disengageable coupling, said disengageable coupling comprising movable means mounted on said member and movable to a position for rendering said disengageable coupling disengaged, abutment means mounted on said movable means, one of said pawls being actuatable to a position for engaging said abutment means and moving said movable means to said coupling disengaging position, the remainder of said movable pawls each being actuatable into operative engagement with a corresponding one of said arresting discs.

2. A shaft control device comprising a driven shaft, a plurality of arresting discs mounted on said driven shaft, a plurality of movable pawls arranged beside said driven shaft, means for selectively actuating any one of said movable pawls, driving means for said driven shaft, said driving means comprising a member which is connected to said shaft through a disengageable coupling, said disengageable coupling comprising movable means mounted on said member and movable to a position for rendering said disengageable coupling disengaged, abutment means mounted on said movable means, one of said pawls being actuatable to a position for engaging said abutment means and moving said movable means to said coupling disengaging position, means limiting the extent of movement of said movable means, the remainder of said movable pawls each being actuatable into operative engagement with a corresponding one of said arresting discs.

3. A shaft control device comprising a driven shaft, a plurality of arresting discs mounted on said driven shaft, a plurality of movable pawls arranged beside said driven shaft, means for selectively actuating any one of said movable pawls, driving means for said driven shaft, said driving means comprising a member which is connected to said shaft through a disengageable coupling, said disengageable coupling comprising movable means mounted on said member and movable to a position for rendering said disengageable coupling disengaged, abutment means mounted on said movable means, one of said pawls being actuatable to a position for engaging said abutment means and moving said movable means to said coupling disengaging position, resilient means biasing said movable means toward coupling engaging position, the remainder of said movable pawls each being actuatable into operative engagement with a corresponding one of said arresting discs.

4. A shaft control device comprising a driven shaft, a plurality of arresting discs mounted on said driven shaft, a plurality of movable pawls arranged beside said driven shaft, means for selectively actuating any one of said movable pawls, driving means for said driven shaft, said driving means comprising a member which is connected to said shaft through a disengageable coupling, said member being positioned coaxially of and rotatably on said shaft, said disengageable coupling comprising movable means mounted on said member and movable to a position for rendering said disengageable coupling disengaged, said movable means comprising a pawl body pivoted about a point on said member which is eccentrically located with respect to said shaft and in a plane at right angles to said shaft, first abutment means mounted on said pawl body, said disengaging coupling further comprising second abutment means mounted on said movable pawl body operatively associated with third abutment means on said shaft, one of said pawls being actuatable to a position for engaging said first abutment means and moving said movable means to said coupling disengaging position wherein said second abutment means no longer engages said third abutment means, the remainder of said movable pawls each being actuatable into operative engagement with a corresponding one of said arresting discs.

5. A shaft control device comprising a driven shaft, a plurality of arresting discs mounted on said driven shaft, a plurality of movable pawls arranged beside said driven shaft, means for selectively actuating any one of said movable pawls, driving means for said driven shaft, said driving means comprising a member which is connected to said shaft through a disengageable coupling, said member being positioned coaxially of and rotatably on said shaft, said disengageable coupling comprising a clamp mounted on said member and having a part thereof encircling said shaft, said part being movable to a position for clamping said shaft, said part having abutment means mounted thereon, one of said pawls being actuatable to a position for engaging said abutment means and moving said clamp out of clamping engagement with said shaft, resilient means biasing said clamp toward clamping engagement with said shaft, the remainder of said movable pawls each being actuatable into operative engagement with a corresponding one of said arresting discs.

6. A shaft control device comprising a driven shaft, a plurality of arresting discs mounted on said driven shaft, a plurality of movable pawls arranged beside said driven shaft, means for selectively actuating any one of said movable pawls, power driving means for said driven shaft, said driving means comprising a member which is connected to said shaft through a disengageable coupling, said disengageable coupling comprising movable means mounted on said member and movable to a position for rendering said disengageable coupling disengaged, abutment means mounted on said movable means, one of said pawls being actuatable to a position for engaging said abutment means and moving said movable means to said coupling disengaging position, the remainder of said movable pawls each being actuatable into operative engagement with a corresponding one of said arresting discs, and manual means for rotating said shaft when said disengaging coupling is rendered disengaged.

WILHELMUS LAMBERTUS VERVEST.
GODFRIED HENDRIK WAARLÉ.

REFERENCES CITED

The following references are of record in the file of this patent:

UNITED STATES PATENTS

| Number | Name | Date |
|---|---|---|
| 2,449,079 | May | Sept. 14, 1948 |